Figures 1, 5:
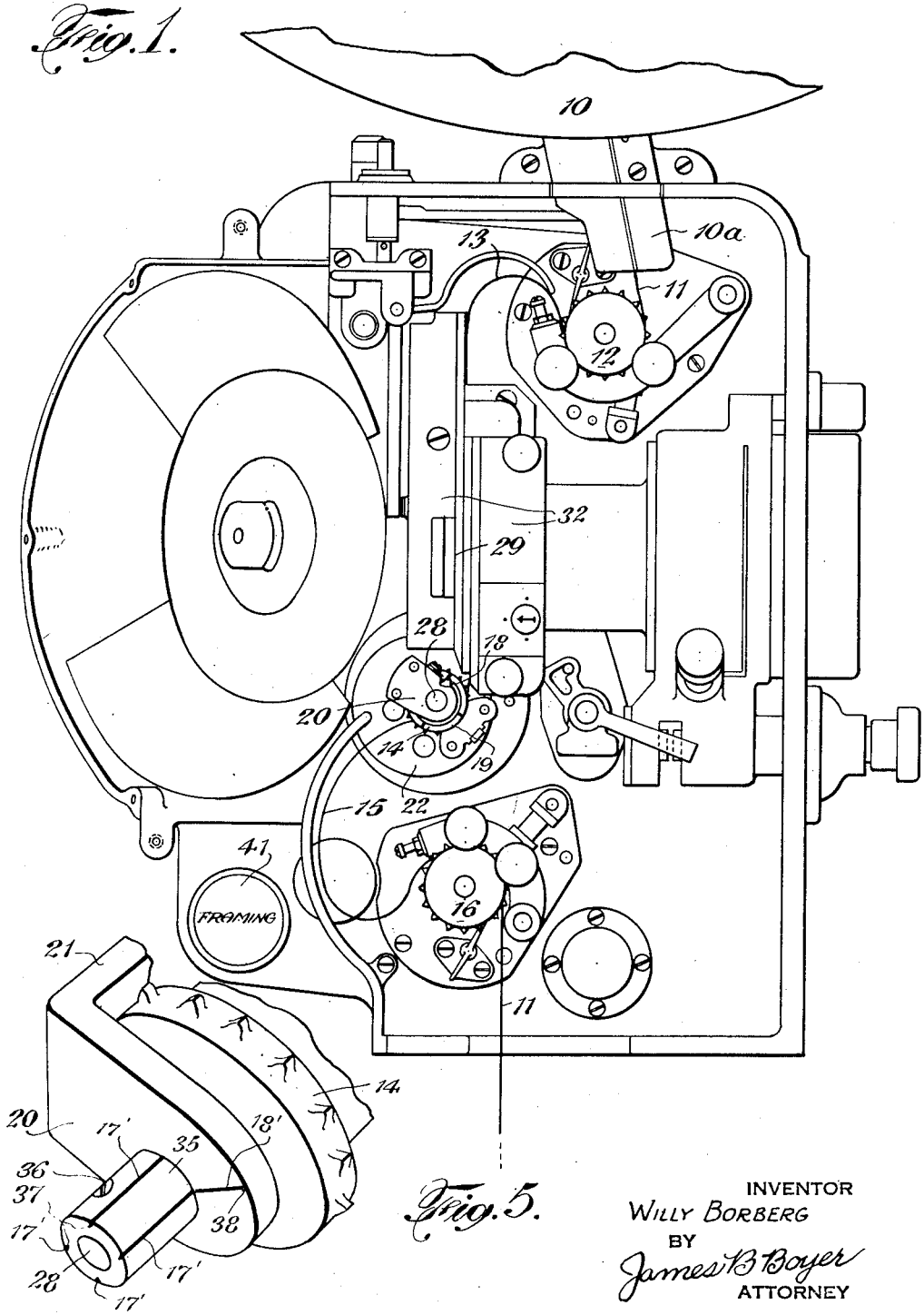

Aug. 19, 1952 W. BORBERG 2,607,261
MOTION-PICTURE PROJECTOR AND FRAMING INDICATOR
Filed March 4, 1949 2 SHEETS—SHEET 1

INVENTOR
WILLY BORBERG
BY
James B Boyer
ATTORNEY

Aug. 19, 1952 W. BORBERG 2,607,261
MOTION-PICTURE PROJECTOR AND FRAMING INDICATOR
Filed March 4, 1949 2 SHEETS—SHEET 2
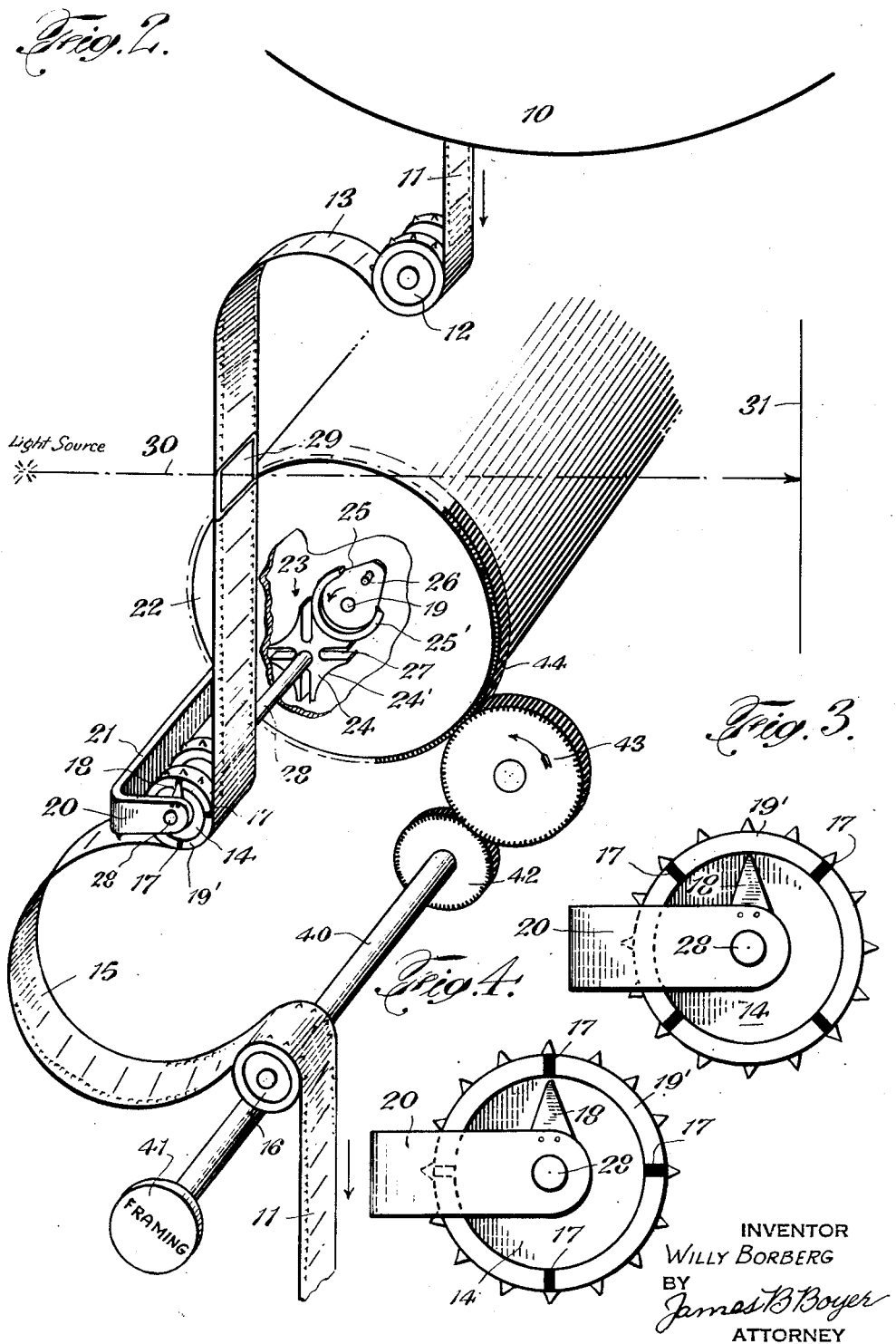
INVENTOR
WILLY BORBERG
BY James B. Boyer
ATTORNEY Patented Aug. 19, 1952

2,607,261

UNITED STATES PATENT OFFICE 2,607,261

MOTION-PICTURE PROJECTOR WITH FRAMING INDICATOR

Willy Borberg, Astoria, N. Y., assignor to International Projector Corporation, Bloomfield, N. J., a corporation of Delaware Application March 4, 1949, Serial No. 79,559

3 Claims. (Cl. 88—18)

The present invention relates to motion picture projectors, and especially to a threading indicator for motion picture projectors.

In threading a film through a motion picture projector, preliminary to projecting the film on a screen, the machine being at rest, a reel of film is first mounted on a spindle in the upper reel magazine. The free end or leader of the film is then pulled downwardly through the throat or upper roller holder at the bottom of the magazine, after which it is fitted around an upper, continuously rotatable sprocket against which it is pressed by a pad roller or shoe. Next, the film strip is looped to form a loose bight for slack after which the film is then led down between the film trap and the gate and fitted about an intermittent or "pull down" sprocket wheel, the film being held against the intermittent sprocket by the corresponding pad roller or shoe. The film is then again looped and passed over another continuously rotatable sprocket wheel against which it is held by another pad roller, after which the film is introduced into a sound head, the leading end being attached to a take up reel.

The intermittent sprocket wheel pulls the film down in equal steps from frame to frame of the film, to bring the successive photographic images or frames into register with a projection aperture in an aperture plate. A projection light beam directed through the projection aperture, throws the picture onto the screen.

It is essential that the projectionist insert the film around the intermittent or pull down sprocket in such a manner that the teeth of the intermittent sprocket wheel engage certain particular perforations of the film so that proper registration of the picture frames with the projection aperture will be obtained, and always maintained during the running or showing of the film. The picture frames usually have four perforations per frame and the intermittent sprocket has 16 teeth. Hence, a step rotation of the intermittent sprocket of 90° will pull down a full frame, that is, position the successive picture frames serially in register with the projection aperture.

Suitable intermittent drive means, such as a Geneva type mechanism, are provided to impart this 90° rotation to the intermittent sprocket. The action of the intermittent or pull down sprocket is designed to pull down the film in a short period of time and then permits the picture frame to remain opposite the aperture plate for a longer time. In other words, the length of time occupied in pulling down a frame to register with the aperture plate, and the length of time during which the picture frame remains in register with the aperture plate together, corresponds with the length of time required for a single cycle of the crank arm of the Geneva gear.

In the art, the film is said to be "locked," when the mutilated cam on the drive member of a Geneva movement engages the star wheel or driven member connected with the intermittent sprocket to prevent rotation of the latter.

It is quite necessary that the projectionist, in threading a film through the machine, make absolutely certain that the film frame and projection aperture in the aperture plate are exactly in register, otherwise parts of two adjacent frames or picture images will be thrown on the screen. This is termed "misframing," and the film is said to be "out of frame." This registration of the picture image and projection aperture is effected while the film trap and gate are separated or open to expose the aperture plate to view as is necessary when threading a film through the machine. The projectionist manually pulls the film past the aperture plate and around the intermittent film sprocket until, for instance, one of the so-called "frame lines" separating two adjacent film frames or picture images is brought to a position wherein the upper edge of a frame line lies just below the lower edge of the projection aperture in the aperture plate and as the picture image is slightly larger than the projection aperture, the upper and lower frame lines of the particular picture image are above and below the edges of the projection aperture, out of range of the aperture. Then the projectionist carefully fits over the sprocket teeth those feed holes in the opposite edges of the film strip which, due to the above method of registration, now lie opposite the teeth of the intermittent or pull-down sprocket.

The projectionist cannot readily determine, without manually operating the film feed mechanism, whether the projecting machine came to rest at a time when the intermittent sprocket was engaged in a turn-over or pull down operation, or is in one of its "locked" positions, because the intermittent or Geneva gear driving the intermittent sprocket, is concealed.

Should the machine have stopped while the intermittent sprocket is at one of its period of rest, no particular confusion arises in threading another film or re-threading a broken and repaired film through the machine, but should the machine have stopped while the intermittent sprocket is in one of its 90° rotations and before this movement has been completed, there is considerable liability that the projectionist, in his haste to change the film, may not notice that the intermittent sprocket is not in one of its positions of rest, and under such circumstances, should he thread the film in the machine and position a frame or picture image with a frame line just below the lower edge of the projection aperture, or just above the upper edge of the projection aperture, as the case may be, that is to say, with a picture frame in full register with the projection aperture, a faulty registration of all succeeding picture frames will result, because, upon starting the machine after threading the film, the intermittent feed sprocket will complete its 90° movement from that position, less than 90°, at which the intermittent sprocket stopped and hence, the pull down sprocket will not fully displace the first picture frame from in front of the projection aperture.

Such shortened pull down movement of the film strip results in positioning the succeeding picture frame in partial registration only with the projection aperture, which incomplete registration is maintained by successive complete 90° pull down movements of the intermittent sprocket.

This failure to properly position a film when threading through a machine is as old as the first commercial motion picture projector, and is of not infrequent occurrence even yet.

The object of this invention is to provide means whereby the projectionist can by casual inspection, instantly determine whether the intermittent sprocket is in its position of rest, or had already started its 90° travel when the machine stopped.

To this end, the intermittent sprocket, or a part moving coincidentally therewith, on the projectionist's side of the projector, is provided with graduations or indicating marks equidistantly spaced at such intervals as to come into register with a relatively fixed indicator or pointer, possibly of a different color from that of the graduations, at the end of each 90° rotation of the intermittent sprocket.

In the form selected for illustration, it has been found convenient to circularly space the graduations around the outer flange of that end of the intermittent sprocket facing the projectionist, and to secure the indicator or pointer cooperating with the graduations, to a part of the frame which, for present purposes, may be regarded as stationary, in relation to the 90° rotation of the sprocket.

Other objects and advantages of the present invention will be referred to in the following specification and claims. Referring to the accompanying drawings forming a part of this application, Fig. 1 is a view of a motion picture projector on the operating side, showing the general location of the present invention to the film path, Fig. 2 is a diagrammatic view showing the intermittent sprocket wheel with the indicator thereon, and the Geneva movement for driving said sprocket, Fig. 3 is an enlarged detail view showing the position of the indicator relatively to the graduations on the intermittent sprocket when the sprocket is arrested short of completion of its 90° movement, Fig. 4 is a similar view showing the position of the indicator relatively to the graduations when the sprocket is in one of its "locked" positions at the completion of its 90° movement, and Fig. 5 is a perspective view of an alternative form of my invention.

A motion picture projector generally includes an upper film magazine 10, Fig. 1, to accommodate a reel of film 11 mounted upon a spindle (not shown) in the usual manner. The film 11 passes down through an upper roller holder 10a, and thence under a continuously rotatable sprocket wheel 12, as shown, after which a loop 13 is formed in the film and the film passed down between the film trap and gate 32' across the projection light beam to an intermittent sprocket 14 located below the film gate. A second loop 15 is then formed in the film 11 before it is passed over another continuously rotatable sprocket 16, and then threaded down into a conventional sound head, not shown.

The Geneva movement 23 (Fig. 2) for imparting intermittent rotary motion to the pull-down sprocket, includes a drive shaft 19 suitably journaled in an oscillatory housing 22, and actuated from the usual power source, not shown, a crank arm 25 being fast near the outer end of the drive shaft 19 and extending at right angles to the shaft. A laterally projecting crank or wrist pin 26 near the outer end of the crank arm 25 engages the radial slots 27 of a four-armed star wheel 24 within the housing 22 and fast on a star wheel shaft 28, journaled in the adjacent end wall of the housing 22.

One end of the star wheel shaft projects beyond the end wall of the housing and carries the pull-down or intermittent sprocket 14, the film engaging with the sprocket teeth to enable the sprocket to feed the film step by step past the projection aperture indicated at 29.

The crank arm 25 is provided with an arcuate flange or cam 25', the peripheral center of which cam lies diametrically opposite the crank pin 26. The flange or cam co-acts with the successive concave dwells 24' of the star wheel 24 to lock the sprocket 14 and the film against movement between the recurrent 90° pull-down operations.

The star wheel 24 and intermittent sprocket 14 fast on the shaft 28 are turned 90° during each rotation of the crank shaft arm 25, to pull down the successive film frames, and at the end of each pull down operation, the arcuate cam 25' enters the adjacent concave dwell 24' to lock the star wheel and the sprocket against movement until the crank arm makes another three-quarter revolution.

The outer end of the star wheel and sprocket shaft 28 is conveniently journaled in, and supported by a bracket arm 20 projecting forwardly from the outer end of a bracket 21, the inner end of which may be secured to, or made integral with, the end wall of the oscillatory housing 22, so as to move therewith.

The bracket arm 20 assists in steadying the star wheel shaft 28, and the pull down sprocket against vibration.

Assuming that the film has been correctly threaded, it is apparent that while the crank arm 25 and star wheel 24 are in the locked position, shown in Fig. 2, the picture on the film 11 is properly framed or in register with the aperture opening 29, so that the projection beam 30 from a suitable light source may pass through the film frame to project the successive picture images upon a screen 31.

However, when the power driving the motion picture machine is cut off, either at the end of the showing of a reel of film, or in case of breakage of a film during a showing, or for any other reason, the machine may come to rest with the Geneva movement at any point in its "pull down" operating position. Theoretically, this condition would occur twenty-five per cent of the number of times that the power is shut off.

As heretofore explained, if registration of a picture image with the projection aperture is attempted while the Geneva movement is engaged in its "pull down" operation, the succeeding picture images will be "out of frame."

In the early days of the art, when the picture images were "out of frame," the power had to be turned off, thus stopping the film feed and interrupting the showing, after which the projectionist had to open the film gate and the trap 32', and advance the Geneva movement 23, by manually turning the drive shaft 19 until the pull down sprocket 14 ceased to rotate, which indicated that the Geneva movement was in its idle, or locked position. Then the projectionist had to manually disengage the film from the sprocket teeth, re-register a film frame with the projection aperture 29, close the film trap and gate and turn on the power again to continue the interrupted showing.

Later, the mechanism was improved by mounting the drive shaft 19 and the star wheel shaft 28 in the oscillatory housing 22 with its bracket 21, 20, so that the housing turns about the longitudinal center of the star wheel shaft 28. A framing shaft 40 having a hand-operated knob 41 fast on its outer end is suitably journaled in a stationary part of the machine casing, the inner end of the framing shaft carrying a fixed gear 42 meshing with an idler 43 journaled on a stud within the casing, the idler, in turn, meshing with a segmental toothed rack 44 secured to the oscillatory housing 22.

Now, when a film frame is accidentally misframed, all that is required of the projectionist is to manipulate the framing knob 41 in one direction or the other to bodily turn the housing 22 with the drive shaft 19 and crank arm 25 through so much of an arc of 90° as is necessary to bring a film frame into register with the projection aperture, such turning movement being very quickly effected while the power is still driving the machine, as shown, for example, in the U. S. Patents to Dina, No. 1,949,454 and 1,949,456 issued March 6, 1934.

This manually operable framing mechanism serves to impart to the web of film a movement downwardly or upwardly in addition to the normal downward movement imparted to the film by the intermittent movement, such additional manually-introduced movement corresponding to the amount or distance by which the film frames are "out of frame," and at the same time, the knob shifts the point of registration of the indicator relatively to the index marks to the same extent, to cause the "in frame" and "out of frame" positions of the indicator and index marks to correspond with the corrected positions of the film frames relatively to the projection aperture.

If the framing knob is turned in the direction to impart an additional movement to the film as it is being fed, the upper loop of slack film is slightly reduced in size and the lower loop of film is slightly increased in size, whereas if the framing knob is turned in a direction to oppose the film feed, the upper loop of slack is slightly enlarged, since the normal feed of the film by the pull-down sprocket is off-set, and the lower loop is slightly decreased in size.

My invention is designed to provide a highly effective yet simple means whereby the projectionist, when threading a film through the machine, can instantly determine whether or not the machine has come to rest with the pull down or intermittent feed sprocket in "locked" position.

As one means to attain this result, the intermittent sprocket wheel 14, or a part turning therewith, is provided, preferably, with graduations or indicating marks 17 equidistantly spaced at such intervals as to come into register with a relatively fixed indicator or pointer 18, possibly of a different color from that of the graduations 17, to indicate the periods of rest between each 90° rotation of the intermittent sprocket wheel 14.

In the form selected for illustration, it has been found convenient to apply the equidistantly spaced graduations 17 circularly around the outer flange 19' of the intermittent sprocket wheel 14 directly facing the projectionist, and to secure the indicator or pointer 18 cooperating with the graduations 17, to the bracket arm 20 carried by and extending at right angles to its bracket 21 secured to the housing 22 enclosing the Geneva movement 23.

Therefore, with the indicator prominently displayed before the eyes of the projectionist he can make certain either that the intermittent star wheel 24, with which the intermittent sprocket 14 is connected, has come to a stop in its rest or locked position, as shown in Figs. 2 and 4, or has come to a stop during its 90° rotation or pull-down operation, as shown in Fig. 3.

By the use of my invention, it is only necessary for the operator, when threading a film into the machine, to see that one of the graduations 17 on the flange 19' is directly in line with the pointer or indicator 18, and he is thereby assured of a proper registration of the picture frame with the projection aperture for proper picture framing.

In those instances wherein the pointer 18 and graduations 17 do not register before a film is threaded into the machine, the machine being at rest, the operator may turn the framing knob 41 to bring one of the graduations 17 into registry with the pointer or indicator, but it is customary for the operator to turn the machine by manipulating the usual hand wheel (not shown) connected with the motor-driven main drive motor shaft of the projector to cause the crank arm 25 of the Geneva gearing to turn the star wheel 24 until a dwell portion 24' of the star wheel is engaged by the cam 25' of the driving crank 25.

The bracket 21 with its arm 20 turning with the oscillatory housing 22 lends itself very well as a support for the pointer or indicator 18 which moves with the bracket so that by co-action with the graduations 17 on the sprocket 14 fast on the star wheel shaft 28, attention will be directed to the relative positions of the star wheel and crank arm, as the projectionist turns the framing knob 41 to rock the housing in one direction or the other.

In a machine equipped with framing mechanism a misframing condition is properly rectified only when the machine is running, at which time the film is being intermittently fed at a very rapid rate. It is only while the machine is at rest that the indication mechanism of this invention is made use of, to enable the projectionist at a glance to determine whether or not the machine came to rest with the intermittent mechanism in a locked or unlocked position.

In correcting a misframing condition while the picture is being shown, the projectionist watches the screen as he operates the framing knob until the picture images on the screen appear "in frame."

However, since the reframing operation results in an alteration, change or shift along the arc of a circle, of the points at which the dwell periods of the intermittent motion occur, a stationarily mounted pointer or indicator 18 would be inaccurate after the first framing operation. By mounting the indicator so as to shift coincidentally with and as the points to which the dwell periods of the intermittent motion are at the operation of the framing mechanism, either forwardly or backwardly, the indicator will always show whether the intermittent motion is in its locked or its unlocked position when the machine comes to rest.

Otherwise stated, the manually operated framing mechanism operates to change the previous relation of the index marks 17 relatively to the pointer 18, by increasing or decreasing the normal length of steps of the film to an extent equal to the extent to which the picture images are out of frame.

In Fig. 5, there is shown an alternative form of my invention, wherein the outer end of the sprocket shaft 28 is extended beyond the outer face of the bracket arm 20 to accommodate a cylindrical collar or dial 35 removably held in place in any convenient manner, as by a set screw 36. The index marks 17' are located equidistantly around the periphery of the collar in consonance with the dwell portions 24' of the star wheel 24, with which the collar or dial turns, since both collar and star wheel are fast on the same shaft 28.

The index marks 17' may be applied by forming equidistantly spaced grooves or flutes 37 about the collar or dial, which flutes may be filled with a suitable pigment contrasting in color with one or more index marks in a similar flute or flutes 38 formed on the adjacent outer face of the normally stationary bracket arm 20. The operation and method of use are as heretofore explained in connection with the form of invention shown in Figs. 1 to 4.

This alternative form presents the film threading indicator at a point readily observable by the operator when he is about to thread a film through the machine, without intervening obstructions.

It will be understood that modifications may be made in the form and arrangement of the present invention without departing from the spirit and scope thereof.

What I claim as new is:

1. In a motion picture projector having a projection aperture with which the frames of a film are to successively register, the combination with an intermittent sprocket to pull down the film to position the frames successively at the projection aperture; intermittently operable means to rotate the sprocket step by step through arcs of equal angularity alternating with dwell periods, said means operable to lock the sprocket against rotation during the dwell periods; and manually operable, oscillatory framing means adjustable to one or another position, to vary the relation between the intermittently operable means and the sprocket for correctly locating the film frames relatively to the projection aperture; of means for use in threading the film through the projector, to indicate whether the intermittent sprocket, upon cessation of machine operation, stands in one of its locked positions or in one of its operative positions, including a series of index marks turning with the sprocket; and an indicator under control of and shiftable by the manually adjustable framing means, to cooperate with said index marks.

2. In a motion picture projector having a projection aperture with which the frames of a film are to successively register, the combination with an intermittent sprocket to pull down the film to position the frames at the projection aperture; intermittently operable means to rotate the sprocket step by step through arcs of equal angularity alternating with dwell periods, said means operable to lock the sprocket against rotation during the dwell periods; and manually operable, oscillatory framing means adjustable to one or another position to vary the relation between the intermittently operable means and the sprocket, for correctly locating the film frames relatively to the projection aperture; of means to indicate whether the intermittent sprocket, upon cessation of machine operation, stands in one of its dwell positions or in one of its operative positions, including a series of index marks turning coincidentally with the intermittently operable film-advancing means; and a normally stationary indicator mounted for movement coincidentally with the oscillatory framing means and under control thereof, to cooperate with said index marks, accordingly as the relation between the sprocket and the intermittently operable means is varied.

3. In a motion picture projector having a projection aperture with which the frames of a film are to successively register, the combination with an intermittent sprocket to pull down the film to position the frames successively at the projection aperture; intermittently operable means to rotate the sprocket step by step through arcs of equal angularity alternating with dwell periods, said means operable to lock the sprocket against rotation during dwell periods; and manually operable framing means adjustable in one or another direction to vary the relation between the intermittently operable means and the sprocket for correctly locating the film frames relatively to the projection aperture; of means to notify the projectionist when the film frames are in register with the projection aperture, said means comprising two coacting indicator means, each of which is movable relatively to the other, one of said indicating means being under control of the adjustable framing means to move accordingly as the framing means is shifted in one direction or the other, the other indicating means turning with the sprocket and positioned to co-act with the first-named indicating means.

WILLY BORBERG.

REFERENCES CITED

The following references are of record in the file of this patent:

UNITED STATES PATENTS

| Number | Name | Date |
|---|---|---|
| 1,168,993 | Anderson | Jan. 18, 1916 |
| 1,262,578 | Cameron | Apr. 9, 1918 |
| 1,298,394 | Proctor | Mar. 25, 1919 |
| 1,404,013 | Cook | Jan. 17, 1922 |
| 1,565,897 | Bouin | Dec. 15, 1925 |